US012392448B2

(12) United States Patent
Seo et al.

(10) Patent No.: US 12,392,448 B2
(45) Date of Patent: Aug. 19, 2025

(54) ELECTRONIC DEVICE COMPRISING TRANSPARENT DISPLAY AND STRUCTURE FOR SUPPORTING TRANSPARENT DISPLAY

(71) Applicant: Samsung Electronics Co., Ltd., Suwon-si (KR)

(72) Inventors: Pilwon Seo, Suwon-si (KR); Jonggeun Yoon, Suwon-si (KR); Chankyu Lim, Suwon-si (KR); Minhyuk Choi, Suwon-si (KR); Deokjin Park, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 17/862,938

(22) Filed: Jul. 12, 2022

(65) Prior Publication Data

US 2022/0349517 A1  Nov. 3, 2022

Related U.S. Application Data

(63) Continuation of application No. PCT/KR2021/001046, filed on Jan. 27, 2021.

(30) Foreign Application Priority Data

Jan. 31, 2020  (KR) .................. 10-2020-0012012

(51) Int. Cl.
 *F16M 13/00* (2006.01)
 *F16M 11/10* (2006.01)
 *F16M 11/18* (2006.01)
(52) U.S. Cl.
 CPC .......... *F16M 13/005* (2013.01); *F16M 11/10* (2013.01); *F16M 11/18* (2013.01)

(58) Field of Classification Search
 CPC ...... F16M 13/005; F16M 11/10; F16M 11/18; F16M 2200/08; F16M 13/00;
 (Continued)

(56) References Cited

U.S. PATENT DOCUMENTS 5,706,559 A * 1/1998 Oliver .................. F16B 21/088
  24/453
6,561,600 B1 * 5/2003 Seeley ................ B60R 11/0235
  312/257.1
(Continued)

FOREIGN PATENT DOCUMENTS

JP  2006-293626 A  10/2006
KR  10-2014-0077570 A  6/2014
(Continued)

OTHER PUBLICATIONS

Korean Office action dated Aug. 13, 2024, issued in Korean Application No. 10-2020-0012012.

*Primary Examiner* — Grant Sitta
(74) *Attorney, Agent, or Firm* — Jefferson IP Law, LLP

(57) ABSTRACT

An electronic device is provided. The electronic device includes a transparent display which is disposed between a first frame having a first opening formed therethrough and a second frame having a second opening formed therethrough, so as to be supported by the first frame and the second frame, a housing including a first hole through which a first connection member is exposed to the outside of the electronic device and a second hole through which a second connection member is exposed to the outside of the electronic device, the housing being coupled to at least one of the first frame or the second frame, a standing member for supporting the housing at a predetermined angle so as to enable the transparent display to display information while being inclined at the predetermined angle, and a printed (Continued)

circuit board electrically connected to the transparent display and including a processor.

16 Claims, 15 Drawing Sheets

(58) Field of Classification Search
CPC . F16M 11/06; G06F 1/16; G06F 3/041; G06F 1/1601; G06F 1/1637; G06F 1/166
See application file for complete search history.

(56) References Cited

U.S. PATENT DOCUMENTS

| | | | | |
|---|---|---|---|---|
| 6,694,683 | B2* | 2/2004 | Anderson | F23M 11/042 |
| | | | | 52/204.5 |
| 6,806,850 | B2* | 10/2004 | Chen | G06F 1/1616 |
| | | | | 353/72 |
| 8,339,536 | B2* | 12/2012 | Sakamoto | G02F 1/133308 |
| | | | | 349/59 |
| 9,223,338 | B2* | 12/2015 | Mukaide | G02F 1/133308 |
| 2005/0105257 | A1* | 5/2005 | Shimizu | G06F 1/1601 |
| | | | | 361/679.08 |
| 2006/0050196 | A1* | 3/2006 | Lee | G02F 1/133308 |
| | | | | 349/58 |
| 2008/0276516 | A1* | 11/2008 | Lin | G06F 1/1601 |
| | | | | 40/797 |
| 2010/0148022 | A1* | 6/2010 | Wang | F16M 11/10 |
| | | | | 248/161 |
| 2010/0171011 | A1* | 7/2010 | Wang | F16M 11/10 |
| | | | | 248/188.8 |
| 2012/0105424 | A1 | 5/2012 | Lee et al. | |
| 2013/0021728 | A1* | 1/2013 | Yamamoto | G06F 1/1637 |
| | | | | 361/679.01 |
| 2013/0107126 | A1* | 5/2013 | Nonomura | H04N 5/64 |
| | | | | 361/679.41 |
| 2013/0107138 | A1* | 5/2013 | Matsumoto | H04N 5/64 |
| | | | | 361/810 |
| 2014/0085783 | A1* | 3/2014 | Li | G06F 1/166 |
| | | | | 361/679.01 |
| 2014/0118306 | A1 | 5/2014 | Moses et al. | |
| 2016/0327729 | A1* | 11/2016 | Patterson | G06F 3/041 |
| 2017/0060209 | A1* | 3/2017 | Volek | G06F 1/266 |
| 2018/0160096 | A1 | 6/2018 | Lee et al. | |
| 2018/0359869 | A1 | 12/2018 | Kim et al. | |

FOREIGN PATENT DOCUMENTS

| | | |
|---|---|---|
| KR | 10-1399209 B1 | 6/2014 |
| KR | 10-2015-0073210 A | 6/2015 |
| KR | 10-1843337 B1 | 3/2018 |
| KR | 10-2018-0071510 A | 6/2018 |
| KR | 10-2018-0071602 A | 6/2018 |
| KR | 10-2018-0135704 A | 12/2018 |
| KR | 10-1947113 B1 | 2/2019 |
| KR | 10-2039694 B1 | 11/2019 |

* cited by examiner (a)

(b)

ELECTRONIC DEVICE COMPRISING TRANSPARENT DISPLAY AND STRUCTURE FOR SUPPORTING TRANSPARENT DISPLAY

CROSS-REFERENCE TO RELATED APPLICATION(S)

This application is a continuation application, claiming priority under § 365(c), of an International application No. PCT/KR2021/001046, filed on Jan. 27, 2021, which is based on and claims the benefit of a Korean patent application number 10-2020-0012012, filed on Jan. 31, 2020, in the Korean Intellectual Property Office, the disclosure of which is incorporated by reference herein in its entirety.

BACKGROUND

1. Field

The disclosure relates to an electronic device including a transparent display and a transparent display support structure configured to support a transparent display.

2. Description of Related Art

In line with development of display technologies, transparent displays have been developed.

Transparent displays include, unlike existing displays, display components made of materials having high levels of optical transmittance. As a result, transparent displays may have transparency.

Transparent displays can display information through both surfaces, can easily draw people's attentions as a new concept of displays, and thus can be used for a digital signage apparatus.

The above information is presented as background information only to assist with an understanding of the disclosure. No determination has been made, and no assertion is made, as to whether any of the above might be applicable as prior art with regard to the disclosure.

SUMMARY

Transparent displays transmit light through both surfaces and display information through both surfaces, and thus require a different type of support structures from existing displays.

Existing support structures are designed such that a display can be supported by using one surface of the display, but a transparent display that displays information through both surfaces needs a support structure having openings formed through both surfaces.

In addition, a transparent display needs to remain inclined with regard to the ground on which the transparent display is installed such that the user can easily identify information displayed by the transparent display.

Aspects of the disclosure are to address at least the above-mentioned problems and/or disadvantages and to provide at least the advantages described below. Accordingly, an aspect of the disclosure is to provide a new form factor for supporting a transparent display such that, even when the transparent display is inclined, the transparent display can be supported stably.

Additional aspects will be set forth in part in the description which follows and, in part, will be apparent from the description, or may be learned by practice of the presented embodiments.

In accordance with an aspect of the disclosure, an electronic device is provided. The electronic device includes a first frame including a first region in which a first opening is formed, and a second region in which a plate-shaped support is formed, a second frame coupled to the first frame and having a second opening formed through a portion corresponding to the first region and the second region of the first frame, a transparent display configured to display information on both surfaces thereof through the first opening of the first frame and the second opening of the second frame and disposed between the first frame and the second frame to be supported by the first frame and the second frame, a housing including a first hole configured to expose a first receptacle to outside of the electronic device, and a second hole configured to expose a second receptacle to the outside of the electronic device and coupled to at least one of the first frame or the second frame, a standing member configured to support the housing at a predetermined angle so as to enable the transparent display to display information while being inclined at a predetermined angle, and a printed circuit board which is electrically connected to the transparent display and on which electronic components including a processor are disposed.

In accordance with another aspect of the disclosure, a transparent display support structure is provided. The transparent display support structure includes a first frame including a first region in which a first opening is formed, and a second region in which a plate-shaped support is formed, a second frame coupled to the first frame and having a second opening formed through a portion corresponding to the first region and the second region of the first frame, a housing coupled to at least one of the first frame or the second frame, and a standing member configured to support the housing at a predetermined angle, wherein the first frame and the second frame support the transparent display disposed between the first frame and the second frame and configured to display information on both surfaces thereof through the first opening of the first frame and the second opening of the second frame.

According to various embodiments of the disclosure, a transparent display can be stably supported.

In addition, even when the transparent display is inclined with regard to the ground, the transparent display can be stably supported.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
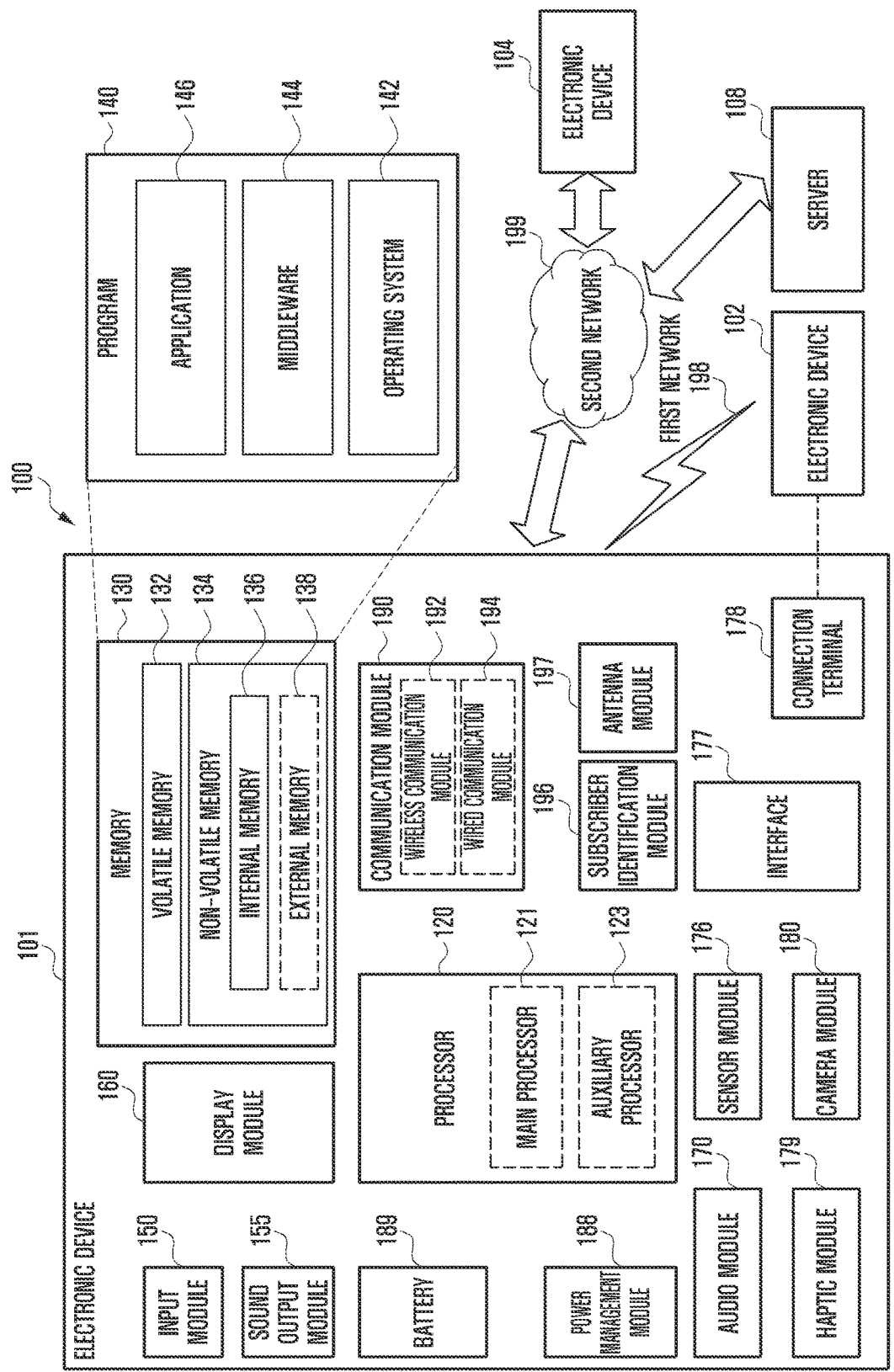
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen). According to various embodiments, the input module 150 may recognize the user's voice. The input module 150 may receive a command via the user's voice. The input module 150 may be a multi-microphone device corresponding to a 360-degree direction so as to recognize a voice generated in the vicinity of the electronic device 101.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one embodiment, the connection terminal 178 may include, for example, an HDMI connector, a USB connector, an SD card connector, a display port (DP), or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC). Power supplied to the electronic device 101 may be supplied in a wired or wireless manner. For example, the electronic device 101 may include a wireless charging module (not shown) to wirelessly receive power. The wireless charging module may be a device configured to receive power by a magnetic induction method or a resonance induction method. The wireless charging module may include a wireless charging coil in which a conductive metal wire is wound.

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may transmit and receive a 5G communication signal so that the electronic device 101 can support 5G communication. For example, the antenna module 197 may transmit and receive signals in several gigahertz bands and several tens to several hundreds of gigahertz bands (e.g., mmWave). The antenna module may include a plurality of antennas (e.g., a plurality of patch array antennas) to generate an RF beam.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
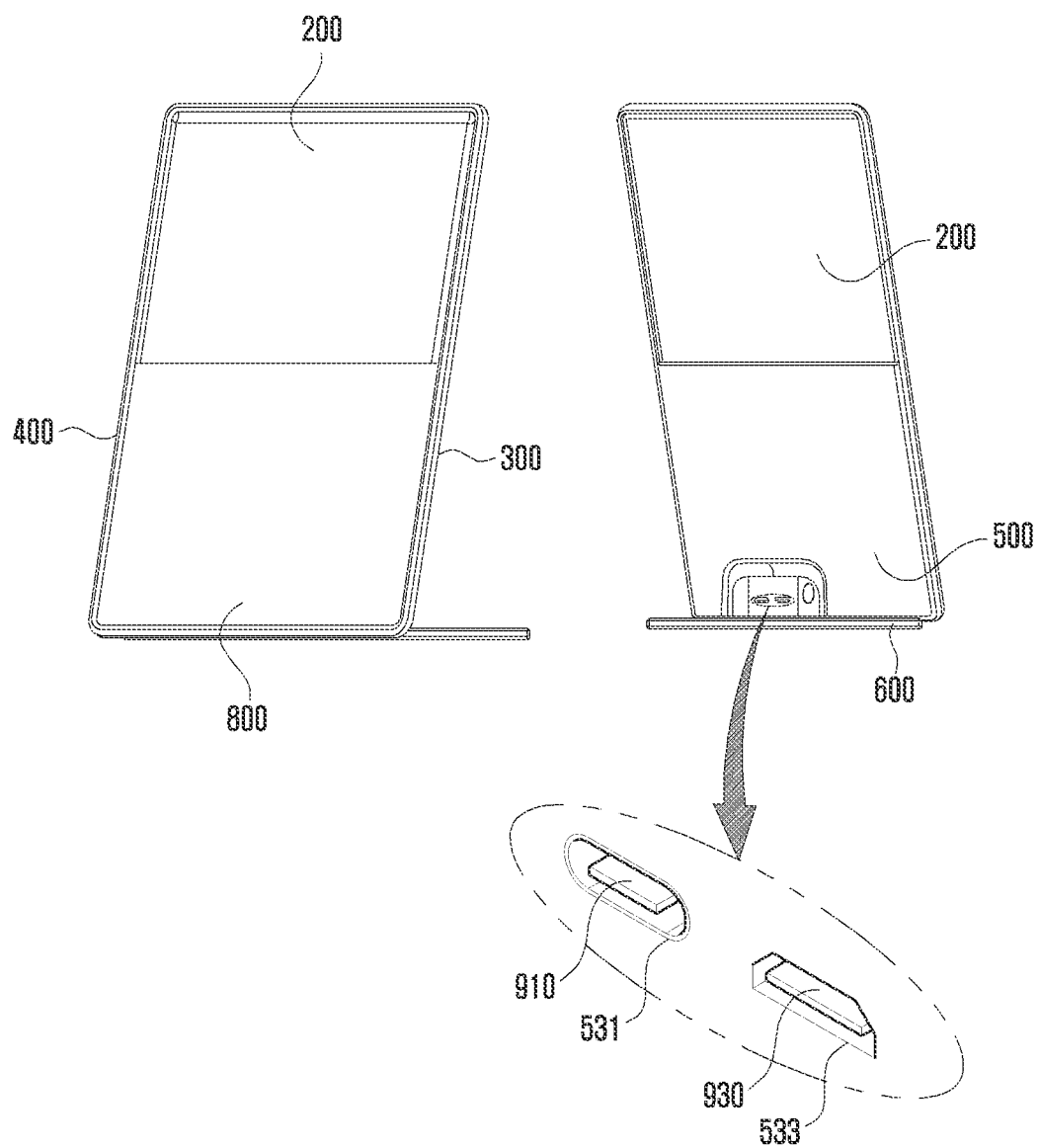
FIG. 2A is a front perspective view and a rear perspective view of an electronic device according to an embodiment of the disclosure.

FIG. 2A is a front perspective view and a rear perspective view of an electronic device according to an embodiment of the disclosure.

Figure 2B:
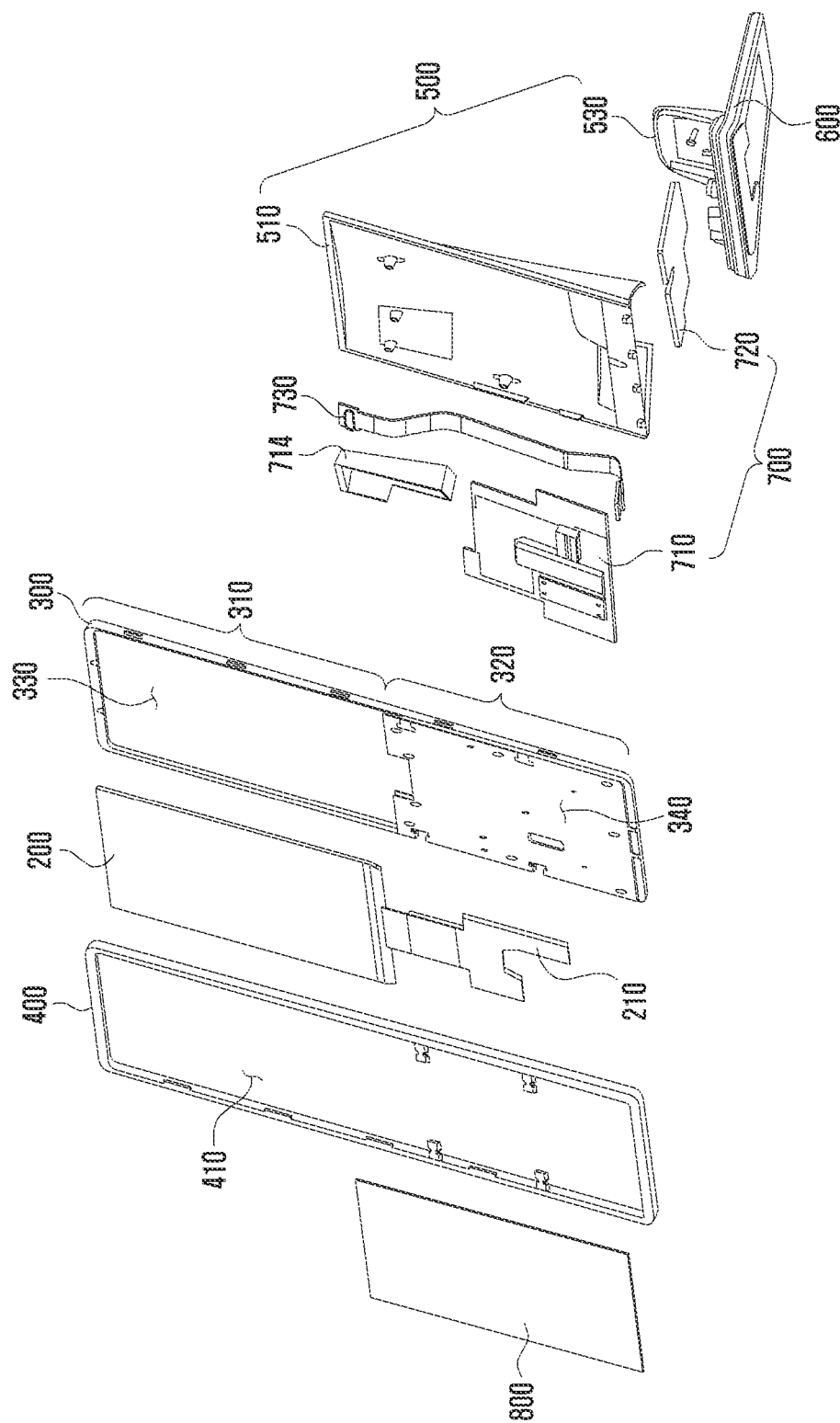
FIG. 2B is an exploded perspective view of the electronic device illustrated in FIG. 2A according to an embodiment of the disclosure.

FIG. 2B is an exploded perspective view of the electronic device illustrated in FIG. 2A according to an embodiment of the disclosure.

Hereinafter, the same reference numbers are used for the same elements.

According to various embodiments, the electronic device (e.g., the electronic device 101 of FIG. 1) may include at least one of a transparent display 200 (e.g., the display module 160 of FIG. 1), a first frame 300, and a second frame 400, a housing 500, and a standing member 600. The transparent display 200 may be supported by a coupling structure of the first frame 300 and the second frame 400. The housing 500 and the standing member 600 may be coupled to the first frame 300 and the second frame 400 such that the transparent display 200 is supported at a predetermined angle with respect to the ground. The ground referred to below may refer to a floor surface on which the electronic device is mounted.

According to various embodiments, the transparent display 200 may refer to a display made of a transparent material. The transparent display 200 may be a display capable of transmitting light incident to the transparent display 200 to a surface opposite to the incident surface. The transparent display 200 may display information in both directions of the transparent display 200 (e.g., the front and rear surfaces of the display). The transparent display 200 may be disposed between the first frame 300 and the second frame 400 to be supported by the first frame 300 and the second frame 400. The transparent display 200 may display information through a first opening 330 of the first frame 300 and a second opening 410 of the second frame 400. At least a portion of the front surface of the transparent display 200 may be exposed to the outside through the second opening 410 of the second frame 400, and at least a portion of the rear surface of the first frame 300 may be exposed to the outside through the first opening 330 of the first frame 300.

According to various embodiments, a display connector 210 may electrically connect the transparent display 200 to a printed circuit board 700. For example, the display connector 210 may be a flexible printed circuit board (FPCB). The display connector 210 may include a display driver IC (DDI) (e.g., 230 of FIG. 5C) configured to control driving of pixels included in the transparent display 200. As shown in FIG. 2B, the display connector 210 may be connected to the transparent display 200 and disposed on the support 340 of the first frame 300.

For example, the transparent display 200 may be a transparent organic light emitting diode (T-OLED) type display. The transparent display 200 may include a substrate, a transistor layer, an organic light emitting layer, and/or an electrode. The substrate, the transistor layer, the organic light emitting layer, and/or the electrode included in the transparent display 200 may be made of a transparent material. For example, the substrate may be made of a polymer material or glass which is made of a transparent material. A transistor included in the transistor layer may be a transistor made of a transparent material such as zinc oxide or titanium oxide. The electrode may be formed of a transparent conducting oxide (TCO). For example, the electrode may be made of indium tin oxide (ITO). The organic light emitting layer may include an element that emits light by receiving electric energy. The organic light emitting layer may be made of a transparent material. In addition, the transparent display 200 may be various types of displays. For example, the transparent display 200 may be configured as a transparent liquid crystal display (TLCD) type display.

According to various embodiments, the first frame 300 and the second frame 400 may support the transparent display 200. The first frame 300 and the second frame 400 may be coupled to each other through a protrusion/groove coupling structure. The first frame 300 and the second frame 400 may be formed of a polymer or metal material having high rigidity to stably support the transparent display 200. The first frame 300 and the second frame 400 may be formed of the same material or may be formed of different materials.

According to various embodiments, the first frame 300 may include a first region 310 and a second region 320. The first region 310 may refer to at least a partial region of the upper region of the first frame 300, and the second region 320 may refer to at least a partial region of the lower region of the first frame 300. Here, the lower region may refer to a region adjacent to the ground on which the electronic device is mounted, and the upper region may refer to a region farther away from the ground than the lower region. The first opening 330 may be formed in the first region 310. At least a partial region of the rear surface of the transparent display 200 may be exposed to the outside through the first opening 330. The support 340 may be formed in the second region 320. Referring to FIG. 2B, the support 340 may be formed in a plate shape to fill at least a portion of the second region 320. The printed circuit board 700 and a sensing member (e.g., the sensing member 3000 of FIG. 9A), which will be described later, may be disposed on the support 340.

According to various embodiments, the second opening 410 may be formed through the second frame 400. The second opening 410 may be formed through the second frame 400 to be at a portion corresponding to the first region 310 and the second region 320 of the first frame 300. At least a partial region of the front surface of the transparent display 200 may be exposed to the outside through the second opening 410 of the second frame 400.

According to various embodiments, the housing 500 may include a first housing 510 and a second housing 530. The first housing 510 and the second housing 530 may be coupled to each other. The housing 500 may be coupled to the first frame 300. The housing 500 may be coupled to a standing member 600 and the first frame 300 to connect the first frame 300 to the standing member 600. A first hole 531 and a second hole 533 may be formed in a partial region of the housing 500 such that a first receptacle 910 and a second receptacle 930 can be exposed to the outside. For example, the first hole 531 and the second hole 533 may be formed through the second housing 530. The first receptacle 910 may be exposed to the outside through the first hole 531, and the second receptacle 930 may be exposed to the outside through the second hole 533. The number of holes formed through the housing 500 may be variously changed. For example, three or more holes may also be formed through the housing 500. In addition, the housing 500 may also be integrally formed without being divided into the first housing 510 and the second housing 530.

According to various embodiments, the standing member 600 may be coupled to the housing 500. The standing member 600 may support the housing 500 in an inclined at a predetermined angle with respect to the ground. The housing 500 inclined with respect to the ground by the standing member 600 may be coupled to the first frame 300. The transparent display 200 supported by the first frame 300 may also be inclined with respect to the ground.

According to various embodiments, the electronic device may include a printed circuit board 700. The printed circuit board 700 may include a first printed circuit board 710 and a second printed circuit board 720. The first printed circuit board 710 may be coupled to the support 340 of the first frame 300. An antenna structure 714 and a board connector 730 may be disposed on the first printed circuit board 710. The board connector 730 may electrically connect the first printed circuit board 710 and the second printed circuit board 720 to each other. The first receptacle 910 and the second receptacle 930 may be disposed on the second printed circuit board 720. The second printed circuit board 720 may be disposed in a space between the first housing 510 and the second housing 530. According to various embodiments, the printed circuit board 700 may not be divided into the first printed circuit board 710 and the second printed circuit board 720.

According to various embodiments, a film member 800 may be a film having a glass-like surface. In addition, the film member 800 may be formed of various types of films. For example, the film member 800 may be formed of a polarizing film. The film member 800 may be attached to the support 340 of the first frame 300 through the second opening 410 of the second frame 400. The film member 800 may prevent the display connector 210 disposed on the support 340 of the first frame 300 from being exposed to the outside to protect the display connector 210. According to various embodiments, the film member 800 may be formed of a metal plate or a polymer plate instead of a film-type material and coupled to the support 340 of the first frame 300 to protect the display connector 210 disposed on the support 340.

Figure 3A:
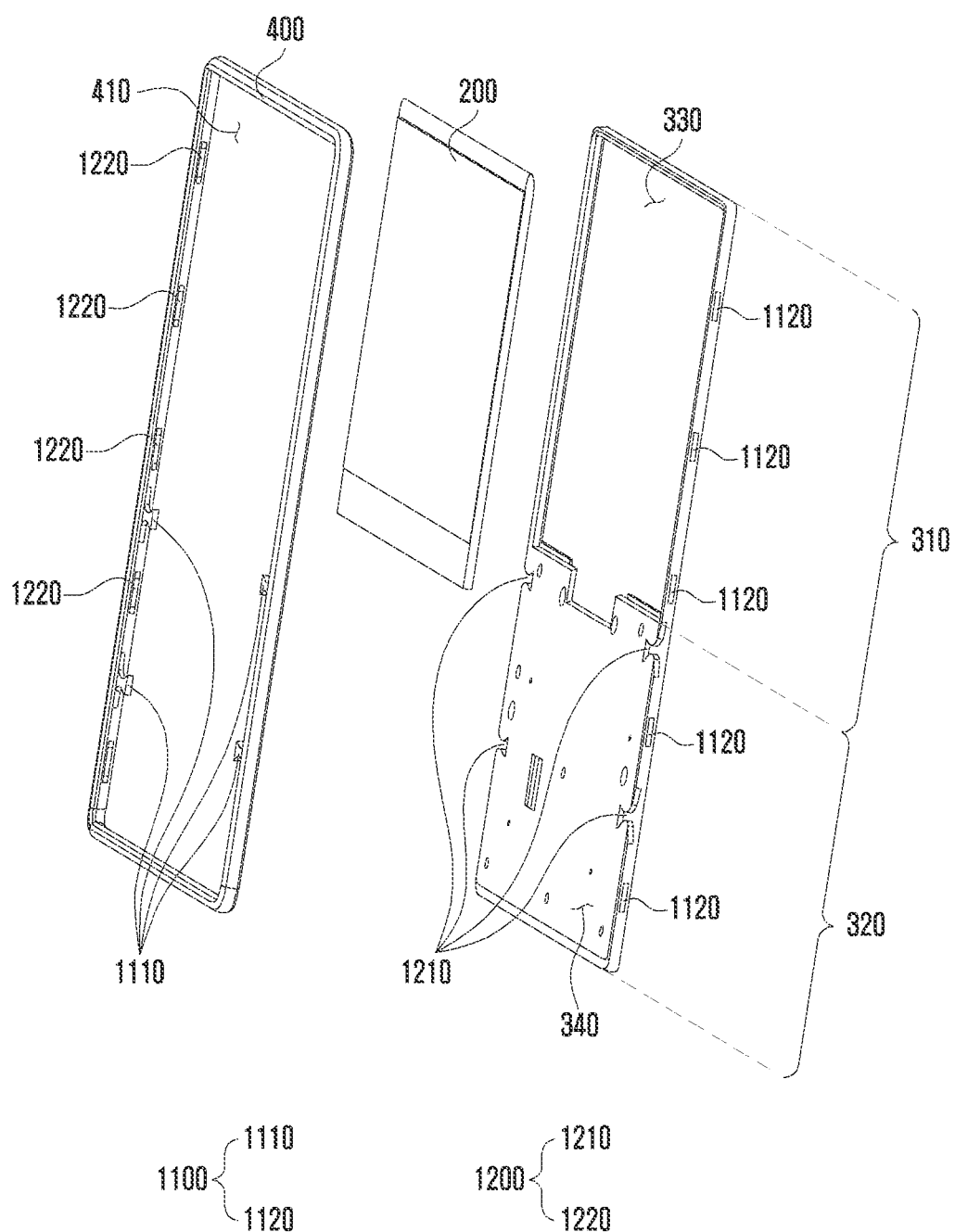
FIG. 3A is an exploded perspective view illustrating a transparent display and a support structure thereof according to an embodiment of the disclosure.
Figure 3B:
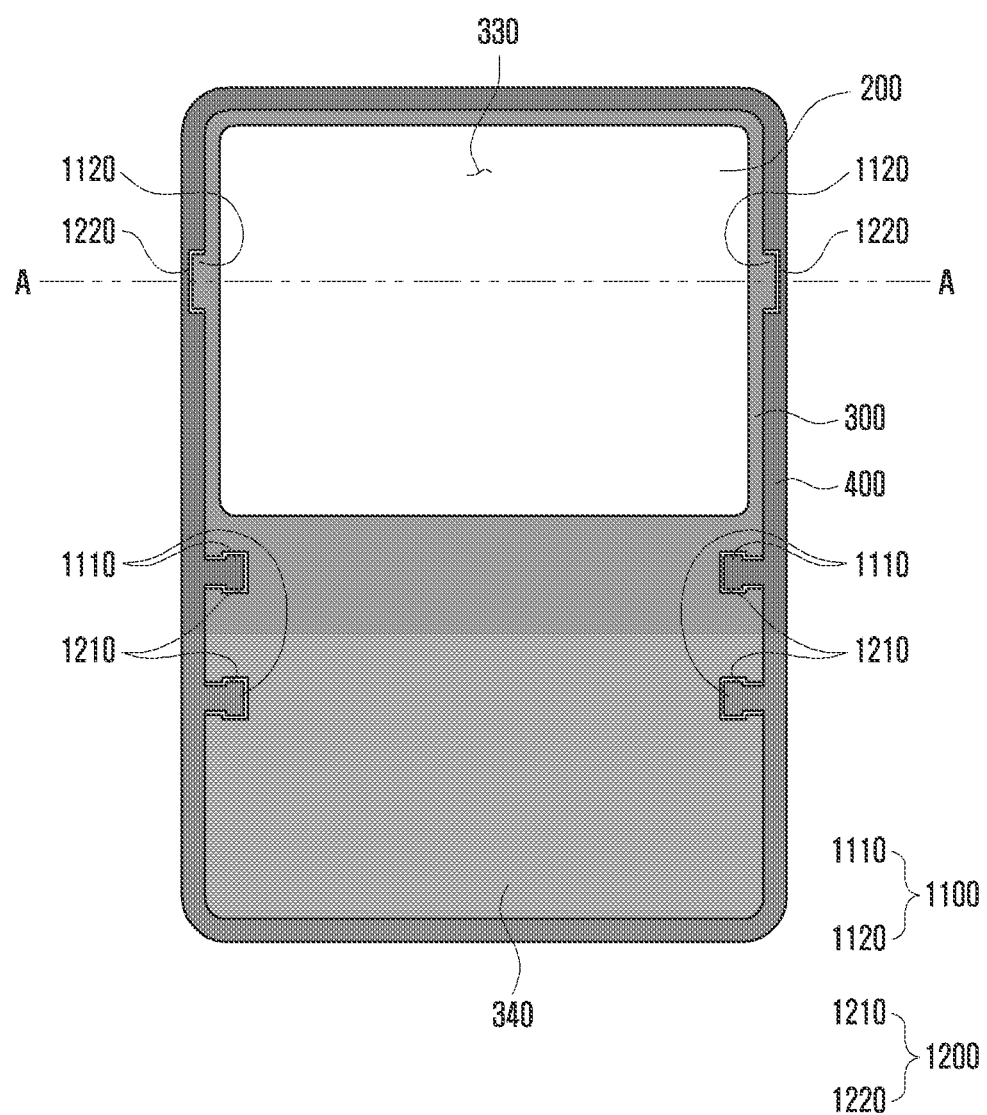
FIG. 3B is a schematic diagram showing a transparent display and a support structure thereof according to an embodiment of the disclosure.

FIG. 3A is an exploded perspective view illustrating a transparent display and a support structure thereof according to an embodiment of the disclosure, FIG. 3B is a schematic diagram showing a transparent display and a support structure thereof according to an embodiment of the disclosure.

Figure 3C:
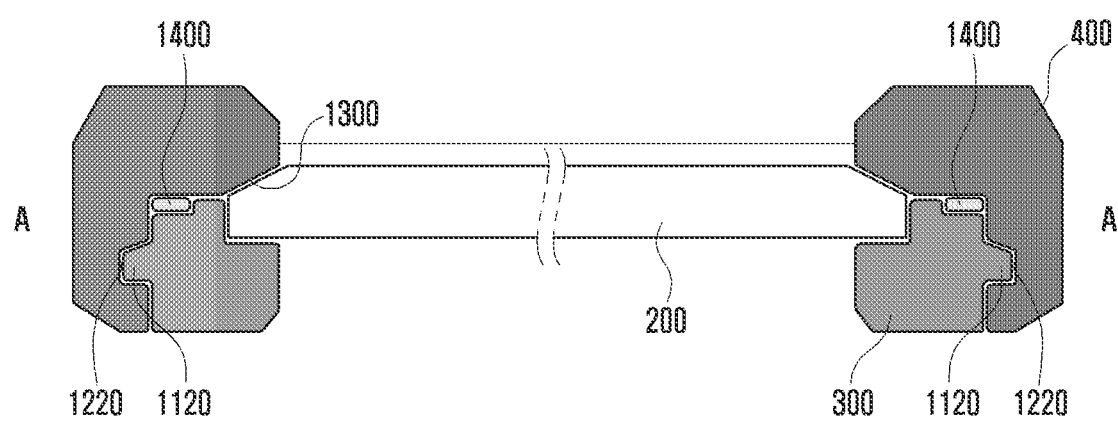
FIG. 3C is a cross-sectional view, taken along line A-A of FIG. 3B according to an embodiment of the disclosure.

FIG. 3C is a cross-sectional view, taken along line A-A of FIG. 3B according to an embodiment of the disclosure.

According to various embodiments, the transparent display 200 and the display connector 210 may be disposed between the first frame 300 and the second frame 400. The transparent display 200 may display information to the outside through the first opening 330 of the first frame 300 and the second opening 410 of the second frame 400. The display connector 210 may be disposed on the support 340 of the first frame 300.

According to various embodiments, the first frame 300 and the second frame 400 may be coupled to each other through a coupling structure having the coupling protrusion 1100 and the coupling groove 1200. The coupling groove 1200 may include first coupling grooves 1210 formed in the support 340 of the first frame 300, and second coupling grooves 1220 concavely formed in the second frame 400 to be spaced apart at a predetermined interval along the inner periphery of the second frame 400. The coupling protrusion 1100 may include first coupling protrusions 1110 protruding from the inner side of the second frame 400 to correspond to the positions where the first coupling grooves 1210 are formed, and second coupling protrusions 1120 protruding from the inner side of the first frame 300 to be spaced apart at a predetermined distance along the outer periphery of the first frame 300. The first coupling protrusion 1110 and the second coupling protrusion 1120 may be inserted into the first coupling groove 1210 and the second coupling groove 1220, respectively, such that the first frame 300 and the second frame 400 are coupled to each other.

Referring to FIG. 3A, the first coupling groove 1210 formed in the plate-shaped support 340 may be formed using a region of the support 340. The size of the first coupling groove 1210 formed in the support 340 may be larger than the size of the second coupling groove 1220 formed in the inner periphery of the second frame 400. The first coupling protrusion 1110 corresponding to the first coupling groove 1210 may also be formed to correspond to the size of the first coupling groove 1210. The first frame 300 and the second frame 400 may be stably coupled to each other by inserting the first coupling protrusion 1110 of the second frame 400 into the first coupling groove 1210 of the first frame 300. The first frame 300 and the second frame 400 may be coupled to each other by coupling between the coupling protrusion 1100 and the coupling groove 1200, and the first frame 300 and the second frame 400 may stably support the transparent display 200. For example, the first frame 300 and the second frame 400 may stably support the transparent display 200 without sagging or bending of the transparent display 200 even if the transparent display 200 remains at a predetermined angle with respect to the ground.

According to various embodiments, the ground part (not shown) of the printed circuit board 700 disposed on the first frame 300 may be electrically connected to the first coupling protrusion 1110 formed on the second frame 400. In this case, the second frame 400 may function as a ground of the electronic device.

The second coupling protrusion 1120 and the second coupling groove 1220 shown in FIG. 3B are only partially illustrated in order to explain the coupling relationship between the first frame 300 and the second frame 400. According to various embodiments, the plurality of the second coupling protrusion 1120 and the second coupling groove 1220 may be provided as shown in FIG. 3A.

Referring to FIG. 3B, the first coupling protrusion 1110 may be formed on the second frame 400. The first coupling groove 1210 may be formed in the support 340 of the first frame 300. The second coupling protrusion 1120 may be formed on the first frame 300. The second coupling groove 1220 may be formed in the second frame 400. The first coupling protrusion 1110 may be inserted into the first coupling groove 1210, and the second coupling protrusion 1120 may be inserted into the second coupling groove 1220, so that the first frame 300 and the second frame 400 may be coupled to each other.

Referring to FIG. 3C, the second coupling protrusion 1120 of the first frame 300 may be inserted into the second coupling groove 1220 of the second frame 400. The transparent display 200 may be disposed between the first frame 300 and the second frame 400. The outer periphery of the transparent display 200 may be inserted into a groove 1300 formed between the first frame 300 and the second frame 400 such that the transparent display 200 is disposed between the first frame 300 and the second frame 400. According to various embodiments, an adhesive material 1400 may be disposed between the first frame 300 and the second frame 400. The adhesive material 1400 may subserve the coupling between the second frame 400 and the first frame 300.

According to various embodiments, the positions where the coupling protrusion 1100 and the coupling groove 1200 are formed may be variously changed. For example, both the first coupling protrusion and the second coupling protrusion may be formed on the first frame, and both the first coupling groove and the second coupling groove may be formed in the second frame. Both the first coupling protrusion and the second coupling protrusion may be formed on the second frame, and both the first coupling groove and the second coupling groove may be formed in the first frame. In addition, the first coupling protrusion and the first coupling groove may be omitted, or the second coupling protrusion and the second coupling groove may also be omitted. According to circumstances, the first frame and the second frame may be coupled to each other in a manner other than the protrusion/groove coupling structure. For example, the first frame and the second frame may be coupled to each other by screw coupling.

Figure 4:
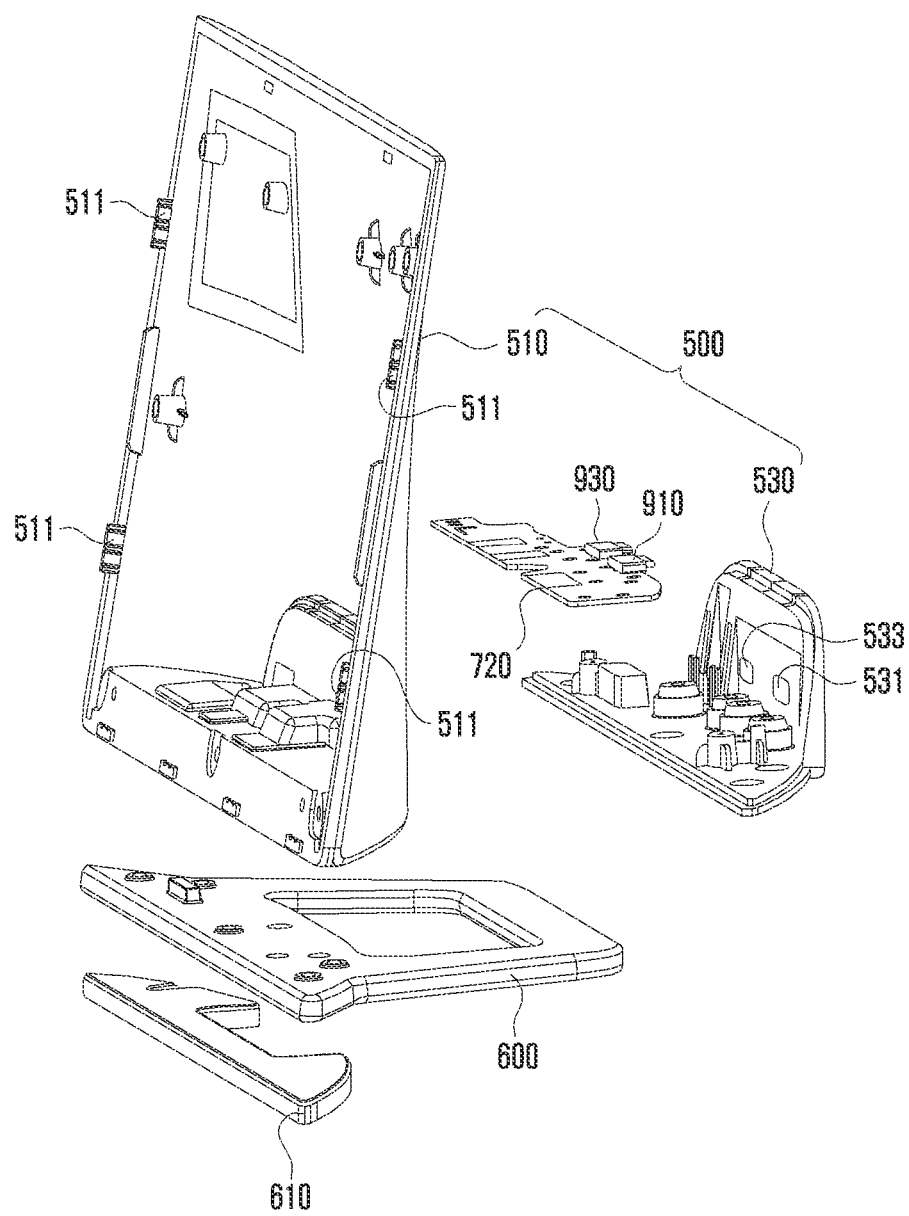
FIG. 4 is an exploded perspective view of a housing and a standing member according to an embodiment of the disclosure.

FIG. 4 is an exploded perspective view of a housing and a standing member according to an embodiment of the disclosure.

According to various embodiments, the standing member 600 may support the housing 500 in an inclined state with respect to the ground. The standing member 600 may include a non-slip pad 610. The non-slip pad 610 may prevent the standing member 600 from sliding with respect to the ground. The non-slip pad 610 may be made of a material having a high coefficient of friction. According to various embodiments, the non-slip pad 610 may be made of a material having adhesion to the ground.

According to various embodiments, the housing 500 may be coupled to the first frame 300. When a hook 511 formed on the housing 500 is inserted into and engaged with a ring (not shown) formed in the first frame 300, the housing 500 may be coupled to the first frame 300. When the housing 500 inclined by the standing member 600 is coupled to the first frame 300, the transparent display 200 supported by the first frame 300 may also remain inclined with respect to the ground. The coupling between the first frame 300 and the housing 500 may be achieved in various manners other than the above-described hook/ring coupling method. For example, the housing 500 and the first frame 300 may be coupled to each other by screw coupling.

According to various embodiments, the second printed circuit board 720 of the printed circuit board 700 may be disposed in a space formed between the first housing 510 and the second housing 530. The first receptacle 910 and the second receptacle 930 may be disposed on the second printed circuit board 720. For example, the first receptacle 910 may correspond to a universal serial bus (USB) C-type connector. The second receptacle 930 may correspond to a USB B-type connector. The first receptacle 910 may be exposed to the outside through the first hole 531 of the second housing 530. The second receptacle 930 may be exposed to the outside through the second hole 533 of the second housing 530.

According to various embodiments, the standing member 600 may rotatably support the housing 500 so that the angle of the transparent display 200 with respect to the ground may be changed. For example, the standing member 600 and the housing 500 may be hinge-coupled to each other. In addition, a rail structure (not shown) may be formed between the standing member 600 and the housing 500. In this case, the housing 500 may rotate with respect to the standing member 600 along the rail formed on the standing member 600. According to various embodiments, the rotation of the housing 500 may be discontinuous. For example, a protrusion/groove structure may be formed between the housing 500 and the rail formed on the standing member 600. The housing 500 may rotate as the protrusion is separated from the groove by an external force applied thereto, and may stop rotating as the protrusion is inserted into the groove again. Accordingly, the rotation section of the housing 500 may be divided by the protrusion/groove structure.

According to various embodiments, the standing member 600 may include an angle adjustor (not shown) configured to rotate the housing 500 with respect to the standing member 600. The angle adjustor (not shown) may be, for example, an electric motor. The housing 500 may rotate with respect to the standing member 600 by the driving force of the angle adjustor (not shown). According to the rotation of the housing 500, the angle of the transparent display 200 may also be changed.

Figure 5A:
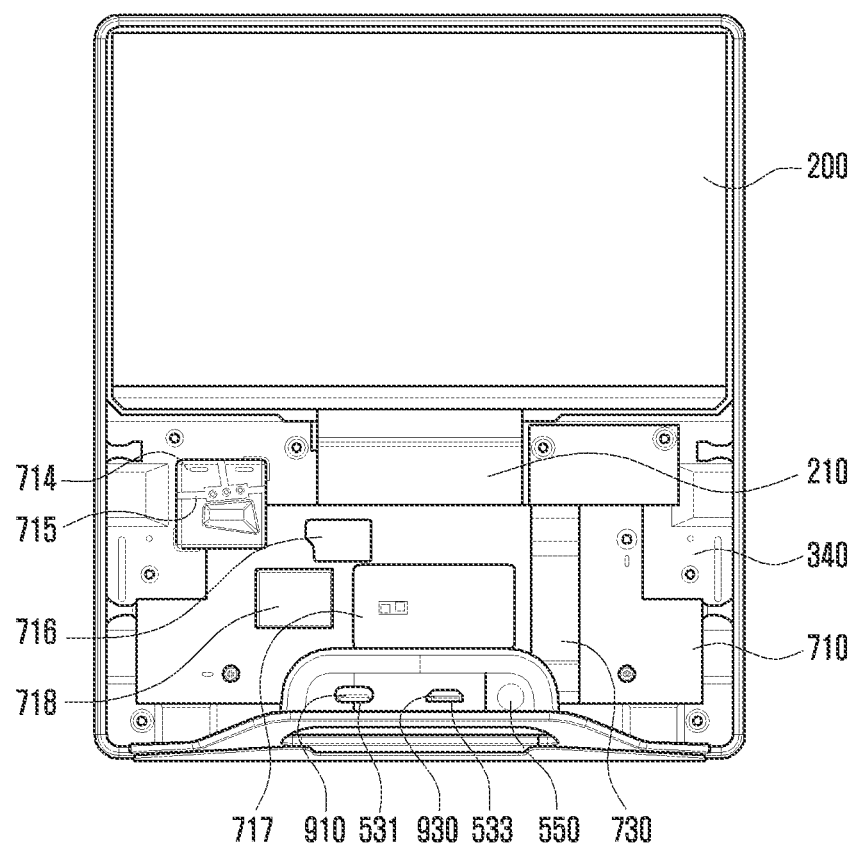
FIGS. 5A, 5B, and 5C show electronic components included in an electronic device and a connection relationship therebetween, according to various embodiments of the disclosure.
Figure 5B:
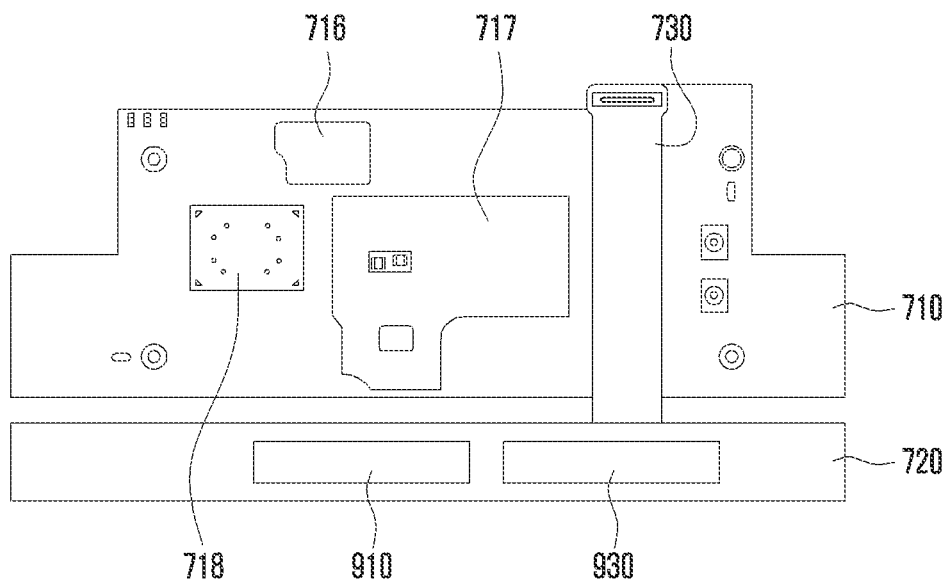
Figure 5C:
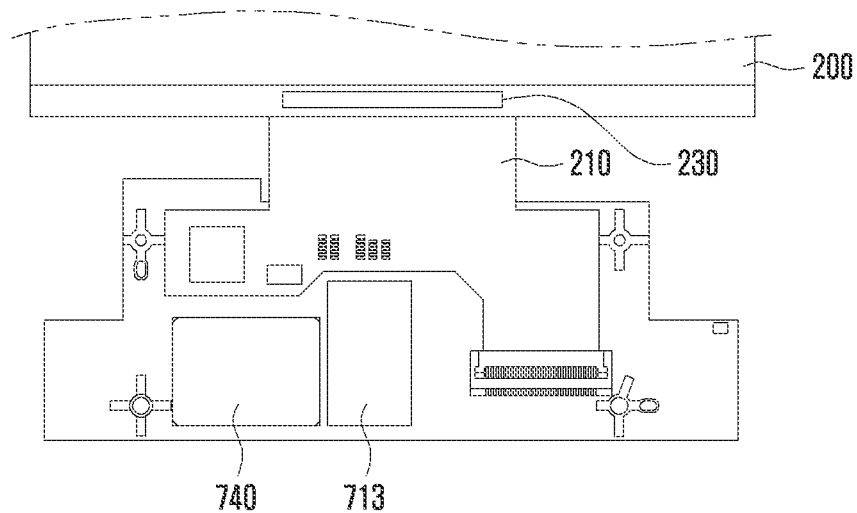

FIGS. 5A, 5B, and 5C show electronic components included in an electronic device and a connection relationship therebetween, according to various embodiments of the disclosure.

FIGS. 5A and 5B illustrate the rear surface of the first printed circuit board 710, and FIG. 5C illustrates the front surface of the first printed circuit board 710.

Referring to FIGS. 5A and 5C, the first printed circuit board 710 may be disposed on the support 340 of the first frame 300. The first printed circuit board 710 may be electrically connected to a processing circuitry 713, an antenna structure 714, a communication circuitry 716, a power circuitry 717, a display power management circuitry 718, a display connector 210, an interface circuitry 740, and a board connector 730.

Referring to FIG. 5B, the second printed circuit board 720 may be connected to the first printed circuit board 710 through a board connector 730. The first receptacle 910 and the second receptacle 930 may be disposed on the second printed circuit board 720.

According to various embodiments, the processing circuitry 713 may include a processor (e.g., the processor 120 of FIG. 1) and a memory (e.g., the memory 130 of FIG. 1). The processor may perform overall control of the electronic device. The memory may store information related to a content reproduced on the transparent display 200.

According to various embodiments, the antenna structure 714 (e.g., the antenna module 197 of FIG. 1) may transmit a signal of the communication circuitry 716 to the outside or receive an external signal to transmit the same to the communication circuitry 716. An antenna line 715 may be formed in the antenna structure 714. The antenna line 715 may be formed of a conductive material to transmit or receive a communication signal.

According to various embodiments, the communication circuitry 716 (e.g., the communication module 190 of FIG. 1) may be connected to an external electronic device through a long-range communication network and a short-range communication network. The communication circuitry 716 may process a signal to be transmitted to an external electronic device or receive, through the antenna structure 714, a signal transmitted from the external electronic device.

According to various embodiments, the power circuitry 717 (e.g., the power management module 188 of FIG. 1) may manage power supplied to the electronic device.

According to various embodiments, the display power management circuitry 718 may manage power supplied to the transparent display 200.

According to various embodiments, the interface circuitry 740 (e.g., the interface 177 of FIG. 1) may process connection to an external electronic device connected to at least one of the first receptacle 910 and the second receptacle 930. For example, the interface circuitry 740 may include a data unit 741, a recognition unit 742, and a power unit 743. The data unit 741 may receive a signal from an external electronic device and transmit the same to the processor. The recognition unit 742 may detect the type of external electronic device. The power unit 743 may supply power required to drive the external electronic device to the external electronic device, based on the type of external electronic device.

According to various embodiments, the board connector 730 may electrically connect the first printed circuit board 710 and the second printed circuit board 720 to each other.

According to various embodiments, the display connector 210 may electrically connect the transparent display 200 to the first printed circuit board 710. The display connector 210 may include a display driver IC (DDI) 230 that controls driving of pixels included in the transparent display 200.

According to various embodiments, a power button 550 may be disposed in the second housing 530. The power button 550 may include a touch button configured to recognize a user's body touch or a physical button capable of receiving a physical input.

According to various embodiments, the first receptacle 910 or the second receptacle 930 disposed on the second printed circuit board 720 may be connected to an external electronic device. For example, the first receptacle 910 may correspond to a USB C-type connector, and the second receptacle 930 may correspond to a USB B-type connector. As another example, both the first receptacle 910 and the second receptacle 930 may correspond to a USB C-type connector. In addition, both the first receptacle 910 and the second receptacle 930 may correspond to the USB B-type connector.

Figure 6:
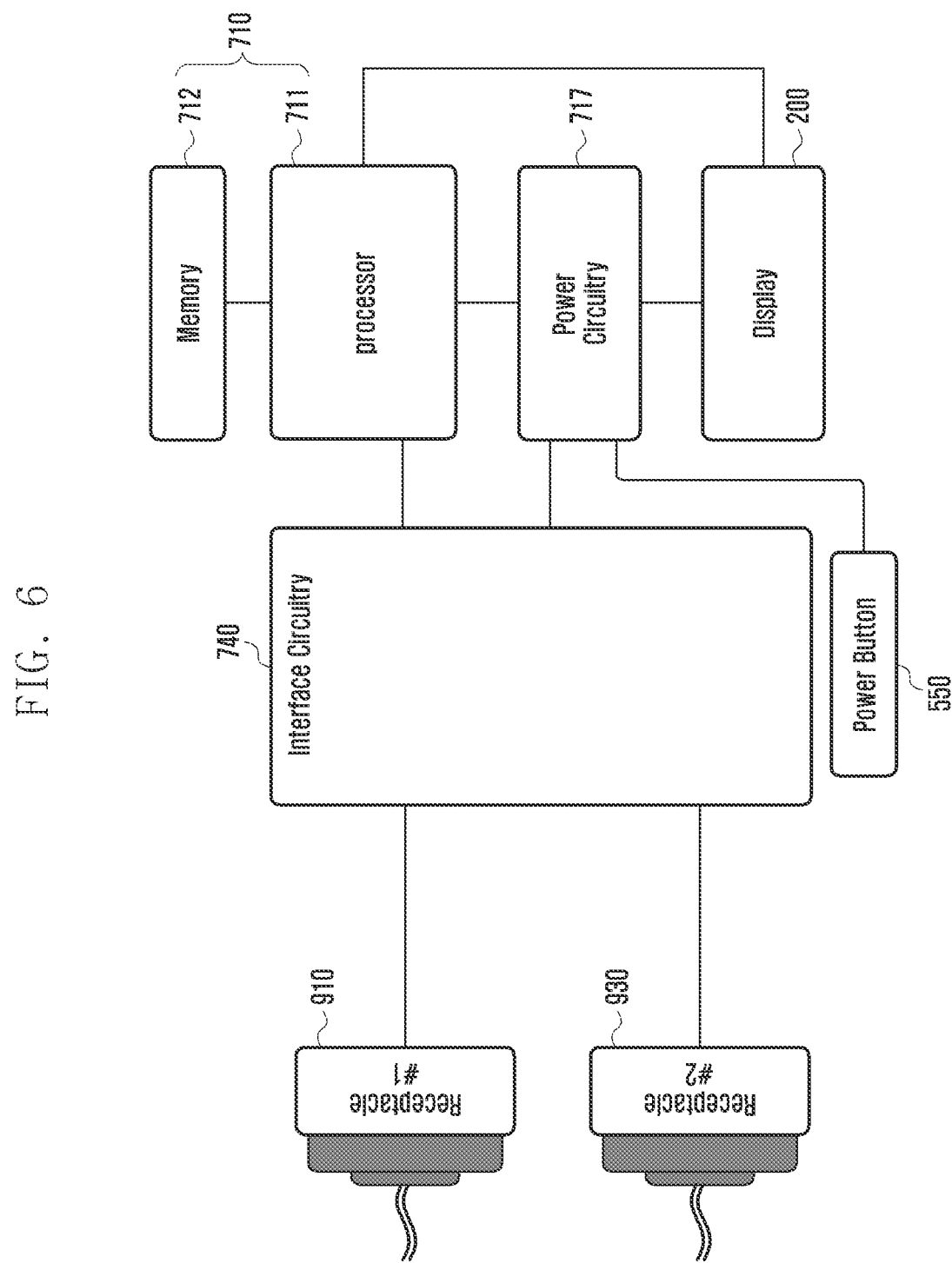
FIG. 6 is a block diagram of an electronic device according to an embodiment of the disclosure.

FIG. 6 is a block diagram of an electronic device according to an embodiment of the disclosure.

According to various embodiments, an external electronic device may be connected to the electronic device through at least one of the first receptacle 910 and the second receptacle 930. The external electronic device may include an input device such as a mouse and a keyboard, and an external power supply device capable of supplying power to the electronic device.

According to various embodiments, the interface circuitry 740 may be connected to the first receptacle 910 and the second receptacle 930. The interface circuitry 740 may recognize the type of external electronic device connected to at least one of the first receptacle 910 and the second receptacle 930. For example, in case that the external electronic device is an input device, the interface circuitry 740 may recognize the type of input device. In case that the input device does not have a separate power source, the interface circuitry 740 may supply power to the input device. In case that the input device is a mouse, the interface circuitry 740 may transmit a mouse input to the processor 711. The processor 711 may display a mouse cursor on the transparent display 200 or move the mouse cursor displayed on the transparent display 200, based on the mouse input transmitted through the interface circuitry 740.

According to various embodiments, in case that an external power supply device is connected through at least one of the first receptacle 910 and the second receptacle 930, the interface circuitry 740 may forward the power supplied from the external power supply device to the power circuitry 717. The power circuitry 717 may convert the applied power into driving power for each electronic component and supply the driving power to the electronic component.

According to various embodiments, a booting command received through the power button 550 may be forwarded to the power circuitry 717, and the power circuitry 717 may supply power to each electronic component to boot the electronic device.

Figure 7:
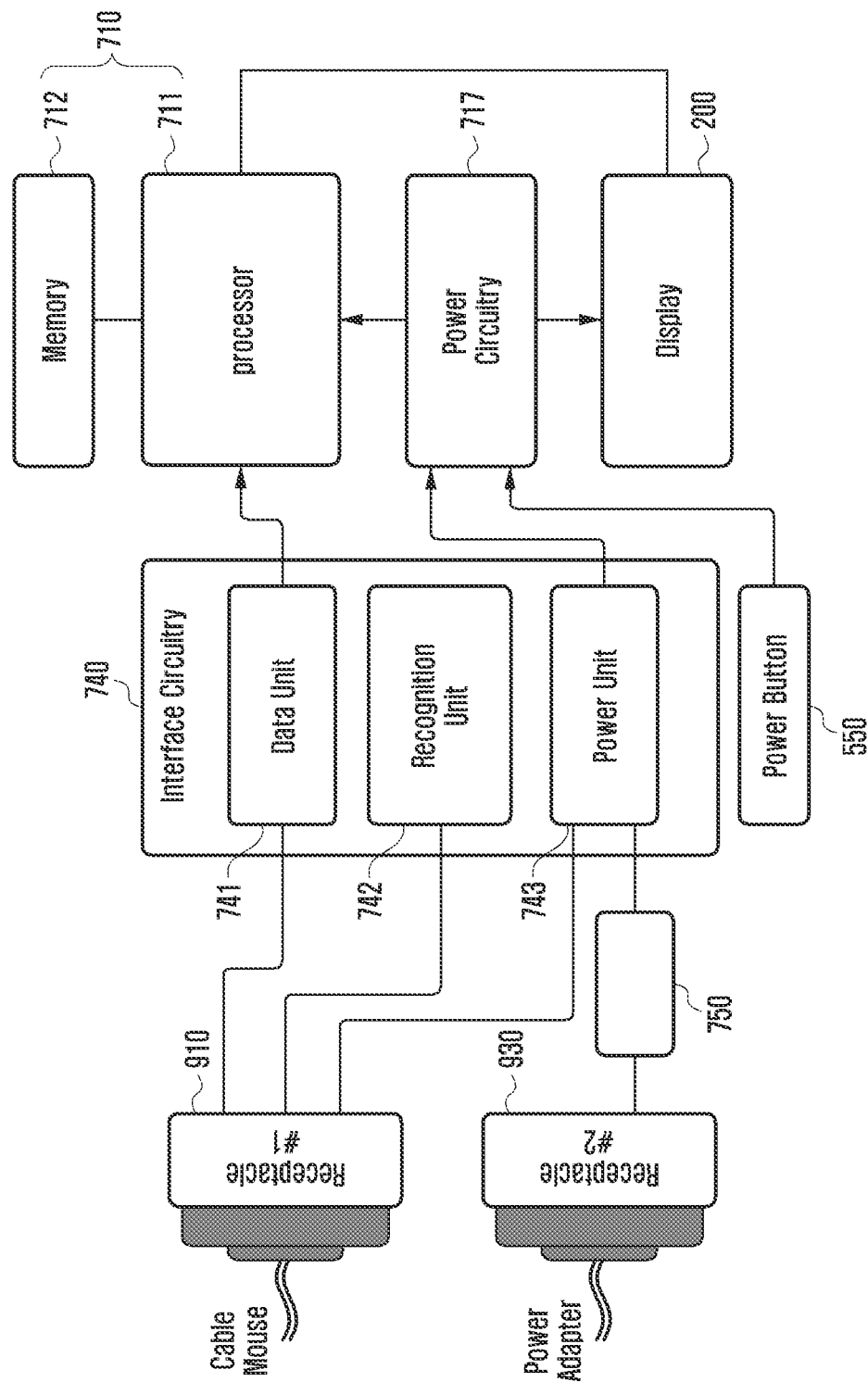
FIG. 7 is a block diagram of an electronic device according to an embodiment of the disclosure.

FIG. 7 is a block diagram of an electronic device according to an embodiment of the disclosure.

Figure 8:
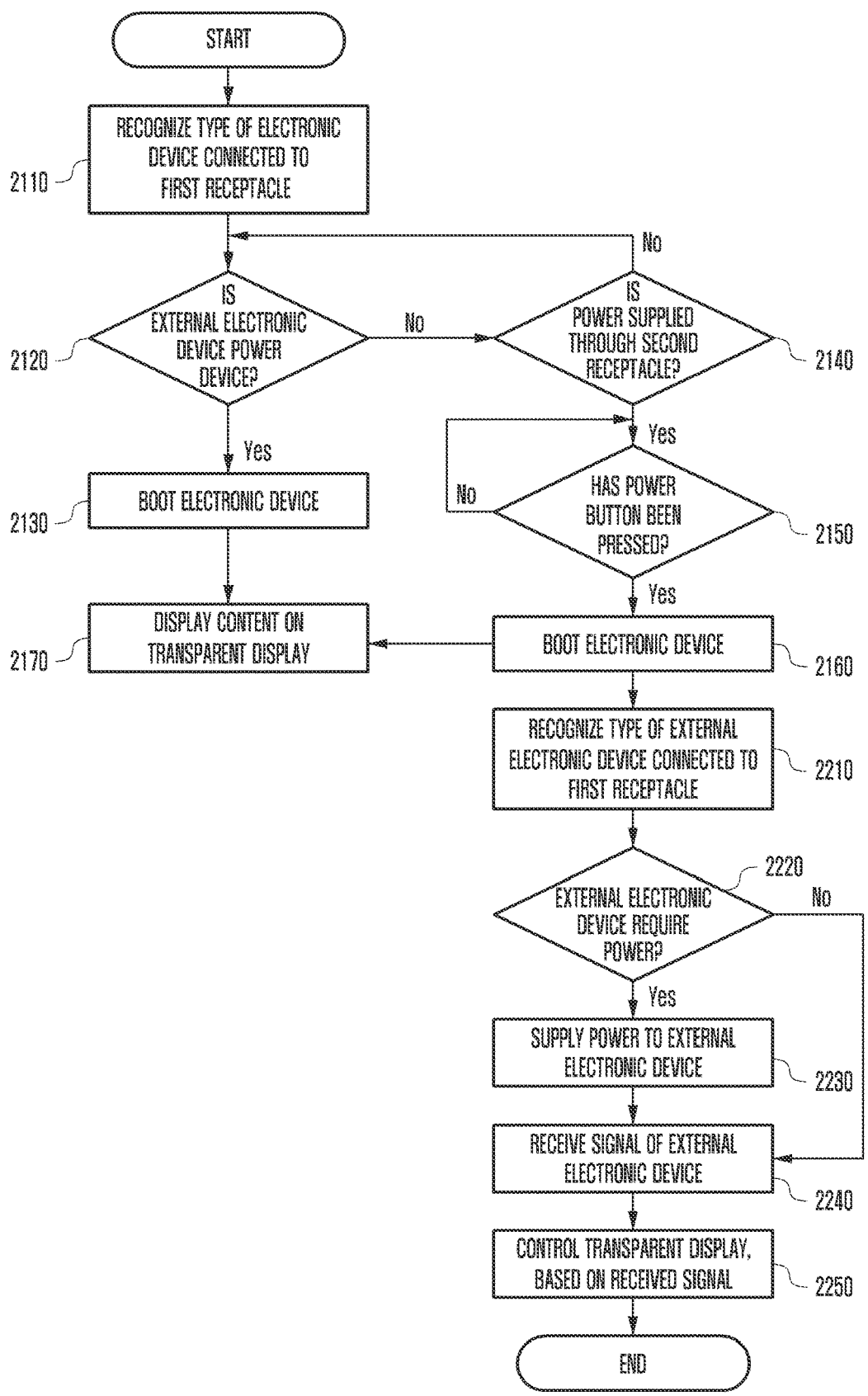
FIG. 8 is an operation flowchart of an electronic device according to an embodiment of the disclosure.

FIG. 8 is an operation flowchart of an electronic device according to an embodiment of the disclosure. The operation flowchart shown in FIG. 8 is only an example, and the electronic device according to various embodiments of the disclosure may be operated in various orders other than the operation order shown in FIG. 8.

According to various embodiments, the interface circuitry 740 may include a data unit 741, a recognition unit 742, and a power unit 743. The first receptacle 910 may correspond to, for example, a USB C-type connector. The first receptacle 910 may be connected to the data unit 741, the recognition unit 742, and the power unit 743 of the interface circuitry 740. The second receptacle 930 may correspond to, for example, a USB B-type connector. The second receptacle 930 may be connected to the power unit 743 of the interface circuitry 740.

According to various embodiments, the external electronic device may be connected to the electronic device through the first receptacle 910, and the external power supply device may be connected to the electronic device through the second receptacle 930.

First, an operation for the case in which an input device is connected to the first receptacle 910 and an external power supply device is connected to the second receptacle 930 will be described.

According to various embodiments, the recognition unit 742 of the interface circuitry 740 may recognize the type of external electronic device connected to the first receptacle 910 at operation 2110. When the external electronic device connected to the first receptacle 910 is not an external power supply device, the electronic device may receive power through an external power supply device connected to the second receptacle 930 at operation 2140. A power converter 750 may be disposed between the second receptacle 930 and the interface circuitry 740. The power converter 750 may convert power input through the second receptacle 930 to suit the electronic device. For example, the power converter may convert a 5V supply to a 4.25V supply. The power input through the second receptacle 930 may be transmitted to the power circuitry 717 through the power unit 743 of the interface circuitry 740.

According to various embodiments, a booting command 2150 received through the power button 550 may be transmitted to the power circuitry 717, and the power circuitry 717 may supply the power to each electronic component to boot the electronic device at operation 2160.

According to various embodiments, the processor 711 may load information related to a content stored in the memory 712 to display the content on the transparent display 200 at operation 2170.

According to various embodiments, the recognition unit 742 of the interface circuitry 740 may recognize the type of external electronic device connected to the first receptacle 910 at operation 2210. When the external electronic device is the type of electronic device requiring power at operation 2220, the power unit 743 of the interface circuitry 740 may supply power to the external electronic device, based on the type of external electronic device by the recognition unit 742 at operation 2230. The data unit 741 of the interface circuitry 740 may receive a signal from the external electronic device at operation 2240 and transmit the same to the processor 711.

According to various embodiments, the processor 711 may control the transparent display 200, based on the signal from the external electronic device transmitted from the data unit 741 of the interface circuitry 740 at operation 2250. For example, when the external electronic device is a mouse, the mouse cursor may be displayed on the transparent display 200 or may be moved according to the movement of the mouse.

Next, a case in which the external power supply device is connected to the first receptacle 910 will be described.

According to various embodiments, the recognition unit 742 of the interface circuitry 740 may recognize the type of device connected to the first receptacle 910 at operation 2110. When the recognition unit 742 recognizes that the first receptacle 910 is connected to the external power supply device and power is supplied through the first receptacle 910 at operation 2120, the power unit 743 of the interface circuitry 740 may receive the external power supply device supplied through the first receptacle 910. The power unit 743 may convert the received power and transmit the converted power to the power circuitry 717.

According to various embodiments, when the recognition unit 742 of the interface circuitry 740 recognizes that the external power supply device is supplied through the first receptacle 910, the electronic device may be booted at operation 2130. According to various embodiments, a booting command received through the power button 550 may be transmitted to the power circuitry 717, and the power circuitry 717 may supply power to each electronic component to boot the electronic device.

According to various embodiments, the processor 711 may load information related to the content stored in the memory 712 and display the content on the transparent display 200 at operation 2170.

According to various embodiments, the electronic device may include a battery (e.g., the battery 189 of FIG. 1) for driving the electronic device. When the electronic device includes a battery, the electronic device may operate on its own power without power supplied through the first receptacle 910 or the second receptacle 930. A booting command received through the power button 550 may be transmitted to the power circuitry 717, and the power circuitry 717 may supply power to each electronic component to boot the electronic device.

Figure 9A:
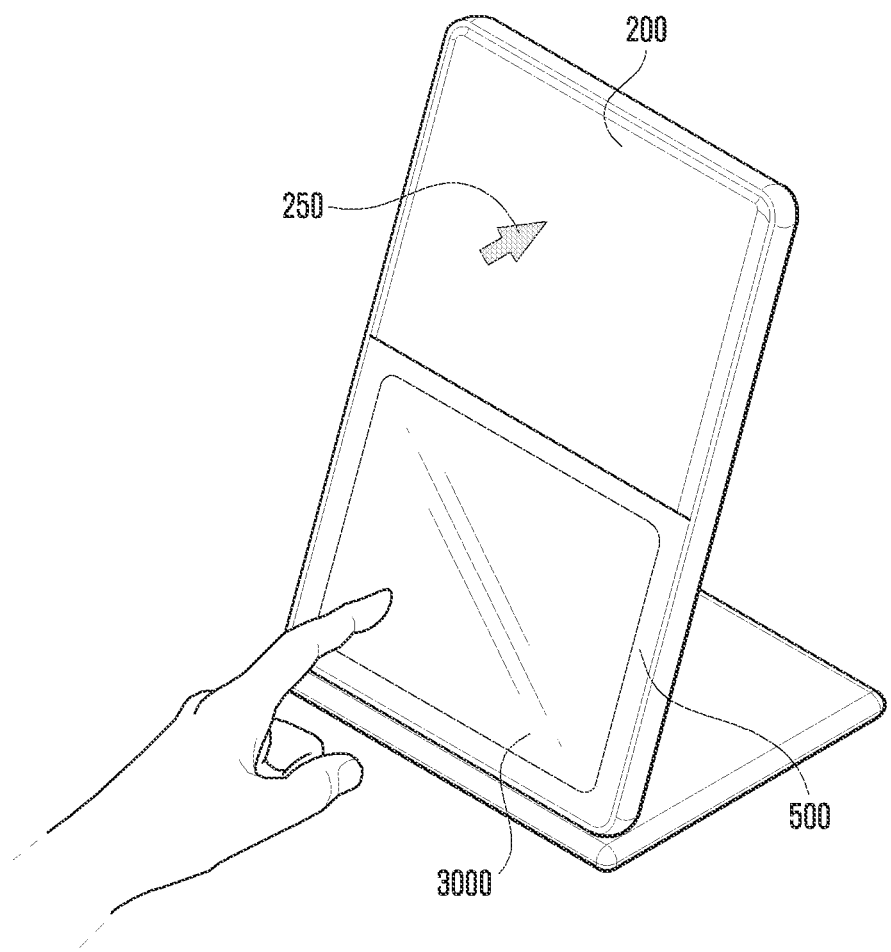
FIGS. 9A and 9B illustrate a state in which an electronic device is being used, according to various embodiments of the disclosure.
Figure 9B:
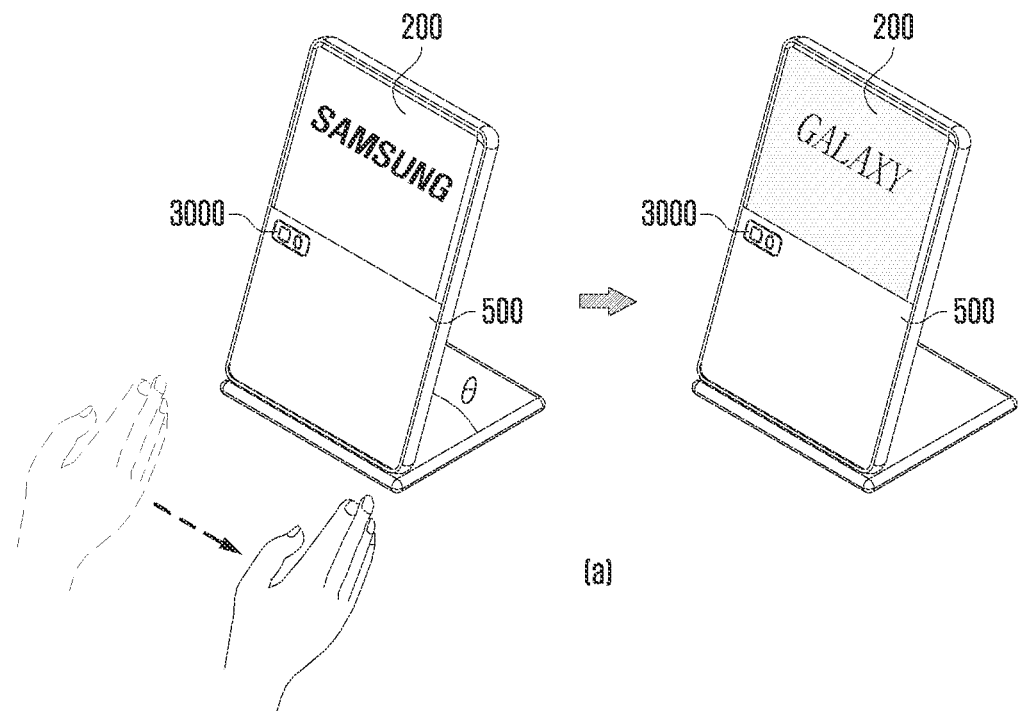
Figure 9B:
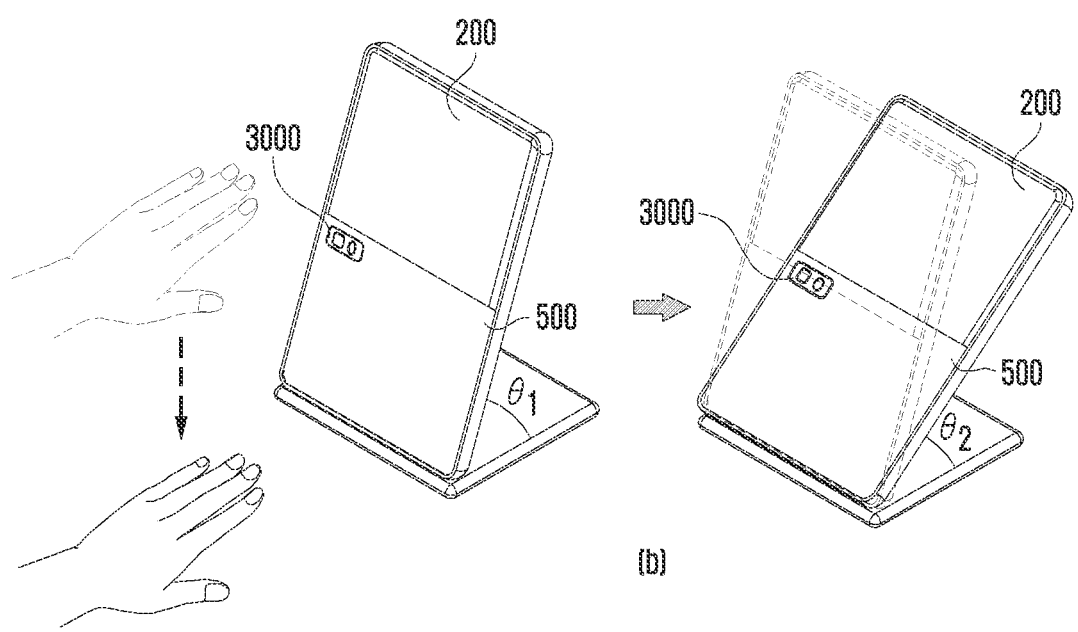

FIGS. 9A and 9B illustrate a state in which an electronic device is being used, according to various embodiments of the disclosure.

According to various embodiments, a sensing member 3000 may be disposed on the support 340 of the first frame 300. The sensing member 3000 may be, for example, at least one of an image sensor, an infrared sensor, and a touch pad. An opening may be formed in the film member 800 covering the support 340 of the first frame 300 in a region corresponding to the region of the support 340 of the first frame 300 where the sensing member 3000 is disposed. The sensing member 3000 may be visually exposed through an opening formed in the film member 800.

According to various embodiments, the processor (e.g., the processor 711 of FIG. 6) may control the transparent display 200 or the angle adjustor (not shown), based on information received through the sensing member 3000.

Referring to FIG. 9A, the sensing member 3000 may be a touch pad. The sensing member 3000 may sense a user's body touch and the movement of the touched part. The processor may display a cursor 250 on the transparent display 200 or move the cursor 250, based on the body touch sensed by the sensing member 3000 and movement of the touched part.

Referring to FIG. 9B, the sensing member 3000 may sense the user's body movement. For example, the sensing member 3000 may sense the user's hand movement. The processor may change the content displayed on the transparent display 200 or control an angle adjustor (not shown), based on the user's hand movement sensed through the sensing member 3000. As illustrated in part (a) of FIG. 9B, when the user's hand moves to the right, the processor may display a following content on the transparent display 200. As shown in part (b) of FIG. 9B, when the user's hand moves downward, the processor may control the angle adjustor (not shown) such that the angle between the ground and the transparent display 200 becomes smaller (e.g., change from 01 to 02 as shown in FIG. 9B). When the user's hand moves upward, the processor may control the angle adjustor (not shown) such that the angle between the ground and the transparent display 200 increases (e.g., change from 02 to 01 as shown in FIG. 9B).

In addition, the sensing member 3000 may receive various information, and the processor may control the transparent display 200, based on the information received through the sensing member 3000.

For example, the sensing member 3000 may detect whether a user approaches the electronic device. When the user's approach is detected through the sensing member 3000, the processor may activate the transparent display 200 and display a content. When the sensing member 3000 detects the user moving away from the electronic device, the processor may deactivate the transparent display 200 and stop displaying a content.

As another example, the sensing member 3000 may detect the user's eyelid movement. The processor may control the transparent display 200, based on the user's eyelid movement sensed through the sensing member 3000. For example, when no user's eyelid movement is detected for a preconfigured time, the processor may deactivate the transparent display 200. When the user's eyelid movement is detected for a preconfigured time, the processor may maintain the transparent display 200 in an activated state and continue to display a content.

An electronic device according to various embodiments of the disclosure may include a first frame including a first region in which a first opening is formed, and a second region in which a plate-shaped support is formed, a second frame coupled to the first frame and having a second opening formed through a portion corresponding to the first region and the second region of the first frame, a transparent display configured to display information on both surfaces thereof through the first opening of the first frame and the second opening of the second frame and disposed between the first frame and the second frame to be supported by the first frame and the second frame, a housing including a first hole configured to expose a first receptacle to outside of the electronic device, and a second hole configured to expose a second receptacle to the outside of the electronic device, and coupled to at least one of the first frame or the second frame, a standing member configured to support the housing at a predetermined angle so as to enable the transparent display to display information while being inclined at a predetermined angle, and a printed circuit board which is electrically connected to the transparent display and on which electronic components including a processor are disposed.

The first frame and the second frame may be coupled to each other by coupling between a coupling protrusion formed on one of the first frame and the second frame and a coupling groove formed in at least the other one of the first frame and the second frame to correspond to the coupling protrusion.

The coupling groove may include a first coupling groove formed in the plate-shaped support of the first frame, and a second coupling groove formed in a side surface of the first frame, and the coupling protrusion may include a first coupling protrusion formed on an inner surface of the second frame to be inserted into the first coupling groove, and a second coupling protrusion inserted into the second coupling groove.

The standing member may rotatably support the housing so that an angle of the transparent display is variable.

The standing member may include an angle adjustor configured to rotate the housing with respect to the standing member.

The electronic device may further include a sensing member disposed on the plate-shaped support of the first frame so as to receive external information, and the processor may be configured to control the angle adjustor, based on information received through the sensing member.

The printed circuit board may include a first printed circuit board coupled to the support of the first frame, and a second printed circuit board coupled to the housing.

Power for operating the electronic device may be received through at least one of the first receptacle or the second receptacle, and connection to an external electronic device may be achieved through the other one of the first receptacle and the second receptacle.

One of the first receptacle and the second receptacle may correspond to a universal serial bus (USB) C-type connector, and the other one of the first receptacle and the second receptacle may correspond to a USB B-type connector.

The electronic device may further include an interface circuitry electrically connected to the printed circuit board, capable of detecting a type of an external electronic device connected through at least one of the first receptacle or the second receptacle, and configured to perform, based on the type of the external electronic device, at least one of an operation of supplying power to the external electronic device or an operation of transmitting a signal of the external electronic device to the processor.

The processor may control the transparent display, based on a signal of the external electronic device transmitted from the interface circuitry.

The electronic device may further include a power button configured to receive a booting input of the electronic device, and booting may be performed based on power connected through at least one of the first receptacle or the second receptacle and a booting signal generated from the power button.

The electronic device may further include a sensing member disposed on the support of the first frame to receive external information.

The sensing member may include at least one of an image sensor, an infrared sensor, or a touch pad.

The processor may control the transparent display, based on the information received by the sensing member.

The electronic device may further include a film member attached to the support of the first frame exposed through the second opening of the second frame.

A transparent display support structure a according to various embodiments of the disclosure may include a first frame including a first region in which a first opening is formed, and a second region in which a plate-shaped support is formed, a second frame coupled to the first frame and having a second opening formed through a portion corresponding to the first region and the second region of the first frame, a housing coupled to at least one of the first frame or the second frame, and a standing member configured to support the housing at a predetermined angle, wherein the first frame and the second frame may support the transparent display disposed between the first frame and the second frame and configured to display information on both surfaces thereof through the first opening of the first frame and the second opening of the second frame.

The first frame and the second frame may be coupled to each other by coupling between a coupling protrusion formed on at least one of the first frame or the second frame and a coupling groove formed in the other one of the first frame and the second frame to correspond to the coupling protrusion.

The coupling groove may include a first coupling groove formed in the plate-shaped support of the first frame, and a second coupling groove formed in a side surface of the first frame, and the coupling protrusion may include a first coupling protrusion formed on an inner surface of the second frame to be inserted into the first coupling groove, and a second coupling protrusion inserted into the second coupling groove.

The standing member may rotatably support the housing so that the angle of the transparent display is variable.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first frame comprising a first region in which a first opening is formed, and a second region in which a plate-shaped support is formed;
    a second frame coupled to the first frame and having a second opening formed through a portion corresponding to the first region and the second region of the first frame;
    a transparent display configured to display information on both surfaces thereof through the first opening of the first frame and the second opening of the second frame and disposed between the first frame and the second frame to be supported by the first frame and the second frame;
    a housing comprising a first hole configured to expose a first receptacle to outside of the electronic device, and a second hole configured to expose a second receptacle to the outside of the electronic device and coupled to at least one of the first frame or the second frame;
    a standing member configured to support the housing at a predetermined angle so as to enable the transparent display to display information while being inclined at a predetermined angle; and
    a printed circuit board which is electrically connected to the transparent display and on which electronic components comprising a processor are disposed,
    wherein the first frame and the second frame are coupled to each other by coupling between a plurality of coupling protrusions formed on one of the first frame and the second frame and a plurality of coupling grooves formed in the other one of the first frame and the second frame so as to correspond to the plurality of coupling protrusions, at least two of the plurality of coupling grooves having different sizes from each other, and
    wherein at least two of the plurality of coupling protrusions have different widths and lengths from each other.

2. The electronic device of claim 1,
    wherein the plurality of coupling grooves comprise a first coupling groove formed in the plate-shaped support of the first frame, and a second coupling groove formed in a side surface of the second frame, and
    wherein the plurality of coupling protrusions comprise a first coupling protrusion formed on an inner surface of the second frame to be inserted into the first coupling groove, and a second coupling protrusion formed on the first frame so as to be inserted into the second coupling groove.

3. The electronic device of claim 1, wherein the standing member rotatably supports the housing so that an angle of the transparent display is variable.

4. The electronic device of claim 3, wherein the standing member comprises an angle adjustor configured to rotate the housing with respect to the standing member.

5. The electronic device of claim 4, further comprising:
    a sensing member disposed on the plate-shaped support of the first frame so as to receive external information,
    wherein the sensing member comprises at least one of an image sensor, an infrared sensor, or a touch pad,
    wherein the processor is configured to control the angle adjustor, based on information received through the sensing member.

6. The electronic device of claim 4, wherein the angle adjustor comprises an electric motor.

7. The electronic device of claim 1,
    wherein the electronic device receives operating power through one of the first receptacle and the second receptacle and achieves a connection to an external electronic device through the other one of the first receptacle and the second receptacle.

8. The electronic device of claim 1,
    wherein one of the first receptacle and the second receptacle corresponds to a universal serial bus (USB) C-type connector, and
    wherein the other one of the first receptacle and the second receptacle corresponds to a USB B-type connector.

9. The electronic device of claim 1, further comprising:
    an interface circuitry electrically connected to the printed circuit board,
    wherein the interface circuitry is configured to:
        detect a type of an external electronic device connected through at least one of the first receptacle or the second receptacle, and
        perform, based on the type of the external electronic device, at least one of an operation of supplying power to the external electronic device or an operation of transmitting a signal of the external electronic device to the processor.

10. The electronic device of claim 9, wherein the processor is configured to control the transparent display, based on a signal of the external electronic device transmitted from the interface circuitry.

11. The electronic device of claim 1, further comprising:
a power button configured to receive a booting input of the electronic device for performing booting based on power connected through at least one of the first receptacle or the second receptacle and a booting signal generated from the power button.

12. The electronic device of claim 1,
wherein the printed circuit board is disposed in the first frame and further includes a ground part, and
wherein the ground part is electrically connected to a coupling protrusion, of the plurality of coupling protrusions, the coupling protrusion formed on the second frame.

13. A transparent display support structure comprising:
a first frame comprising a first region in which a first opening is formed, and a second region in which a plate-shaped support is formed;
a second frame coupled to the first frame and having a second opening formed through a portion corresponding to the first region and the second region of the first frame;
a housing coupled to at least one of the first frame or the second frame; and
a standing member configured to support the housing at a predetermined angle,
wherein the first frame and the second frame support a transparent display disposed between the first frame and the second frame and configured to display information on both surfaces thereof through the first opening of the first frame and the second opening of the second frame,
wherein the first frame and the second frame are coupled to each other by coupling between a plurality of coupling protrusions formed on one of the first frame and the second frame and a plurality of coupling grooves formed in the other one of the first frame and the second frame so as to correspond to the plurality of coupling protrusions, at least two of the plurality of coupling grooves having different sizes from each other, and
wherein at least two of the plurality of coupling protrusions have different widths and lengths from each other.

14. The transparent display support structure of claim 13,
wherein the plurality of coupling grooves comprise a first coupling groove formed in the plate-shaped support of the first frame, and a second coupling groove formed in a side surface of the first frame, and
wherein the plurality of coupling protrusions comprise a first coupling protrusion formed on an inner surface of the second frame to be inserted into the first coupling groove, and a second coupling protrusion formed on the second frame so as to be inserted into the second coupling groove.

15. The transparent display support structure of claim 13, wherein the standing member rotatably supports the housing so that an angle of the transparent display is variable.

16. An electronic device comprising:
a first frame comprising a first region in which a first opening is formed, and a second region in which a plate-shaped support is formed;
a second frame coupled to the first frame and having a second opening formed through a portion corresponding to the first region and the second region of the first frame;
a transparent display configured to display information on both surfaces thereof through the first opening of the first frame and the second opening of the second frame and disposed between the first frame and the second frame to be supported by the first frame and the second frame;
a housing comprising a first hole configured to expose a first receptacle to outside of the electronic device, and a second hole configured to expose a second receptacle to the outside of the electronic device and coupled to at least one of the first frame or the second frame;
a standing member configured to support the housing at a predetermined angle so as to enable the transparent display to display information while being inclined at a predetermined angle; and
a printed circuit board which is electrically connected to the transparent display and on which electronic components comprising a processor are disposed,
wherein the first frame and the second frame are coupled to each other by coupling between a plurality of coupling protrusions formed on one of the first frame and the second frame and a plurality of coupling grooves formed in the other one of the first frame and the second frame so as to correspond to the plurality of coupling protrusions,
wherein the plurality of coupling grooves comprise a first coupling groove formed in the plate-shaped support of the first frame, and a second coupling groove formed in a side surface of the second frame, and
wherein the plurality of coupling protrusions comprise a first coupling protrusion formed on an inner surface of the second frame to be inserted into the first coupling groove, and a second coupling protrusion formed on the first frame so as to be inserted into the second coupling groove.

* * * * *